United States Patent [19]
Hager et al.

[11] Patent Number: 5,177,942
[45] Date of Patent: Jan. 12, 1993

[54] MOWER DECK WITH IMPROVED BELT DRIVE ARRANGEMENT

[75] Inventors: Joseph P. Hager, Burnsville; Thomas K. Bricko, Lakeville, both of Minn.

[73] Assignee: The Toro Company, Minneapolis, Minn.

[21] Appl. No.: 745,317

[22] Filed: Aug. 15, 1991

[51] Int. Cl.⁵ .............................................. A01D 35/00
[52] U.S. Cl. ..................................... 56/11.6; 56/13.6; 56/289
[58] Field of Search .................. 56/6, 11.6, 13.5, 13.6, 56/231, 255, 289, 294, 295

[56] References Cited

U.S. PATENT DOCUMENTS

| 4,068,452 | 1/1978 | Schaefer et al. | 56/11.6 |
| 4,159,613 | 7/1979 | Knudson et al. | 56/11.6 X |
| 4,497,160 | 2/1985 | Mullet et al. | 56/13.6 X |
| 4,813,215 | 3/1989 | Chase et al. | 56/11.6 |

Primary Examiner—Thuy M. Bui
Attorney, Agent, or Firm—John W. Bunch

[57] ABSTRACT

An improved mower cutting deck (30) includes a main deck section (38), pivotal wing deck sections (40), and belt drive system (80) with electric clutch/brake units (131, 132) connected therebetween which allow constant belt tension to be maintained while minimizing belt wear and related maintenance. If desired, breakaway assemblies (150) may also be connected between the deck sections (38, 40). Shroud and baffle arrangements (162) are also provided for better grass dispersion.

15 Claims, 3 Drawing Sheets

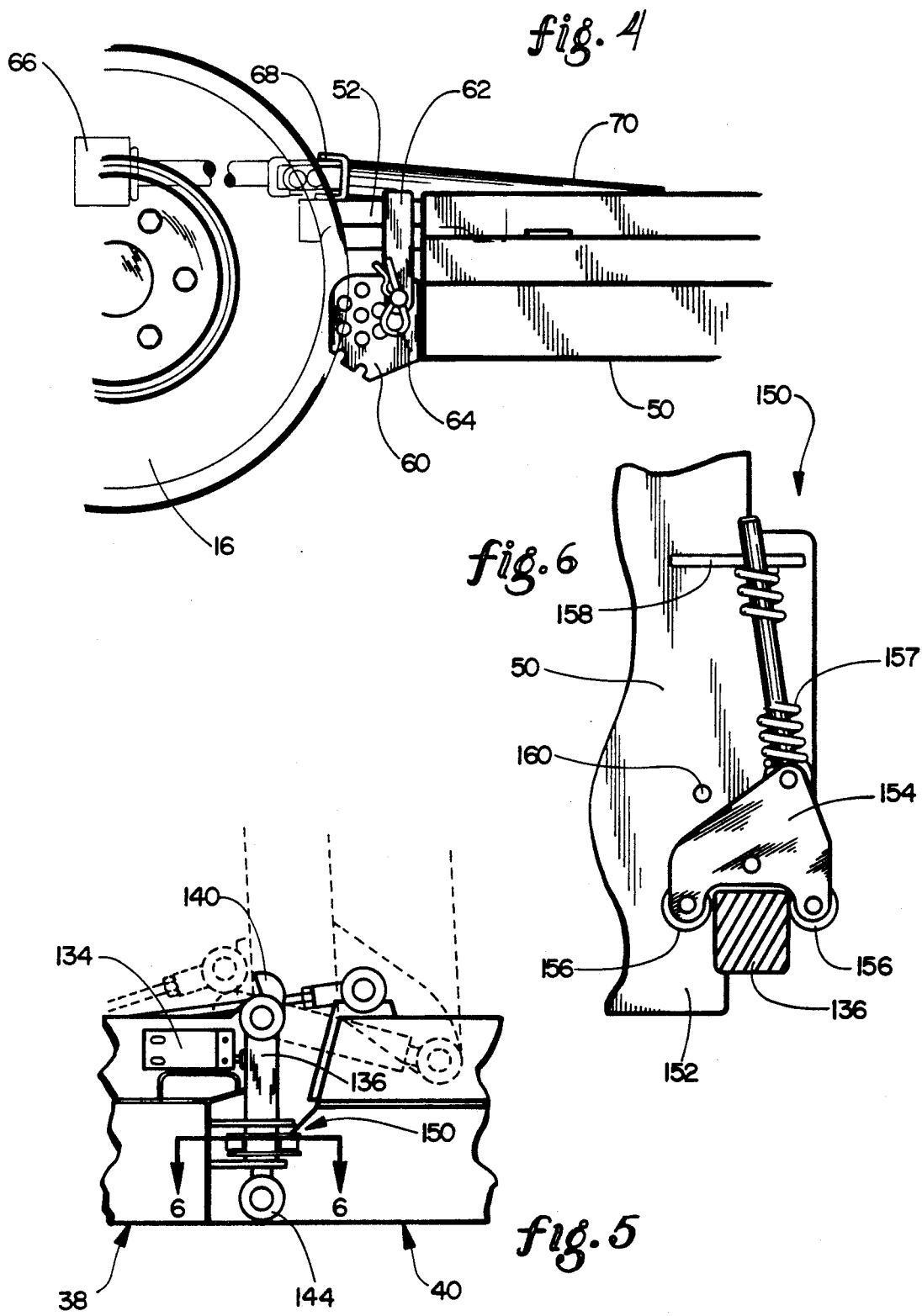

MOWER DECK WITH IMPROVED BELT DRIVE ARRANGEMENT

TECHNICAL FIELD

The present invention relates generally to self-propelled riding mowers. More particularly, this invention concerns a sectional mower deck having an improved belt drive arrangement incorporating electric clutch/brake units to minimize misalignment of the belts while maintaining substantially constant belt tension upon relative pivotal positioning of the deck sections for better control and longer belt life.

BACKGROUND ART

Various types of self-propelled riding mowers have been available heretofore. Except for those relatively large commercial mowers which utilize cutting reels and are typically used on golf courses, most such riding mowers include mower decks housing one or more rotary blades. Some riding mowers utilize sectional mower decks with several interconnected rotary blades thereacross. The Toro Company, which is the assignee hereof, has been a leading manufacturer of such mowers for years.

Sectional mower decks typically include pivotal wing sections which can be selectively raised to present a more narrow profile such as for trimming, storage or transport. When such wing sections are raised, the cutters must be disengaged for safety purposes. Belt drive arrangements are typically utilized in such mower decks and there have been various approaches to such disengagement. For example, U.S. Pat. Nos. 4,395,865 and 4,429,515 to Davis shows a self-propelled lawn mower having a sectional mower deck wherein a combined clutch and brake mechanism mechanically disengages the drive belt to the blade and simultaneously brings it to a stop when the wing section is raised beyond its cutting range. U.S. Pat. Nos. 3,152,431 to Ott and 3,116,583 to Mason are also representative of the prior art in this regard. As the wing section are raised, belt tension is released to disengage the cutters thereon and is then reapplied later to re-engage the cutters upon lowering the wing sections. However, the belt drive arrangements of the prior art have tended to suffer from relatively higher belt wear and misalignment, which in turn has caused higher maintenance and repair costs.

There is thus a need for a new mower deck incorporating an improved belt drive arrangement which minimizes belt misalignment while maintaining substantially constant belt tension for longer wear and less maintenance.

SUMMARY OF INVENTION

The present invention comprises a mower deck which overcomes the foregoing and other difficulties associated with the prior art. In accordance with the invention, there is provided an improved mower deck with a new belt drive arrangement incorporating electric clutch/brake units for selectively disengaging drive to the belts leading to the pivotal wing sections. The various pulleys included in the belt drive arrangement herein are oriented along the pivotal hinge axis so that any twisting of the belt is primarily in a lengthwise direction so as to minimize potential belt misalignment, wear and related maintenance. If desired, a breakaway mechanism can be provided between each wing section and the main deck section to provide for some flexibility in the event of impact with a fixed object, such as a tree or the like, in order to avoid damage. If desired, shrouds and baffles can be provided about the cutting blades for better grass dispersion behind the mower check.

BRIEF DESCRIPTION OF DRAWINGS

A better understanding of the invention can be had by reference to the following Detailed Description in conjunction with the accompanying Drawings, wherein:

FIG. 4 is a side detail of the real height adjustment assembly;

FIG. 5 is a front detail of the front pivot joint between the main and wing deck sections; and FIG. 6 is sectional view taken along lines 6—6 of FIG. 5 in the direction of the arrows showing further details of the breakaway assembly.

DETAILED DESCRIPTION

Figure 1:
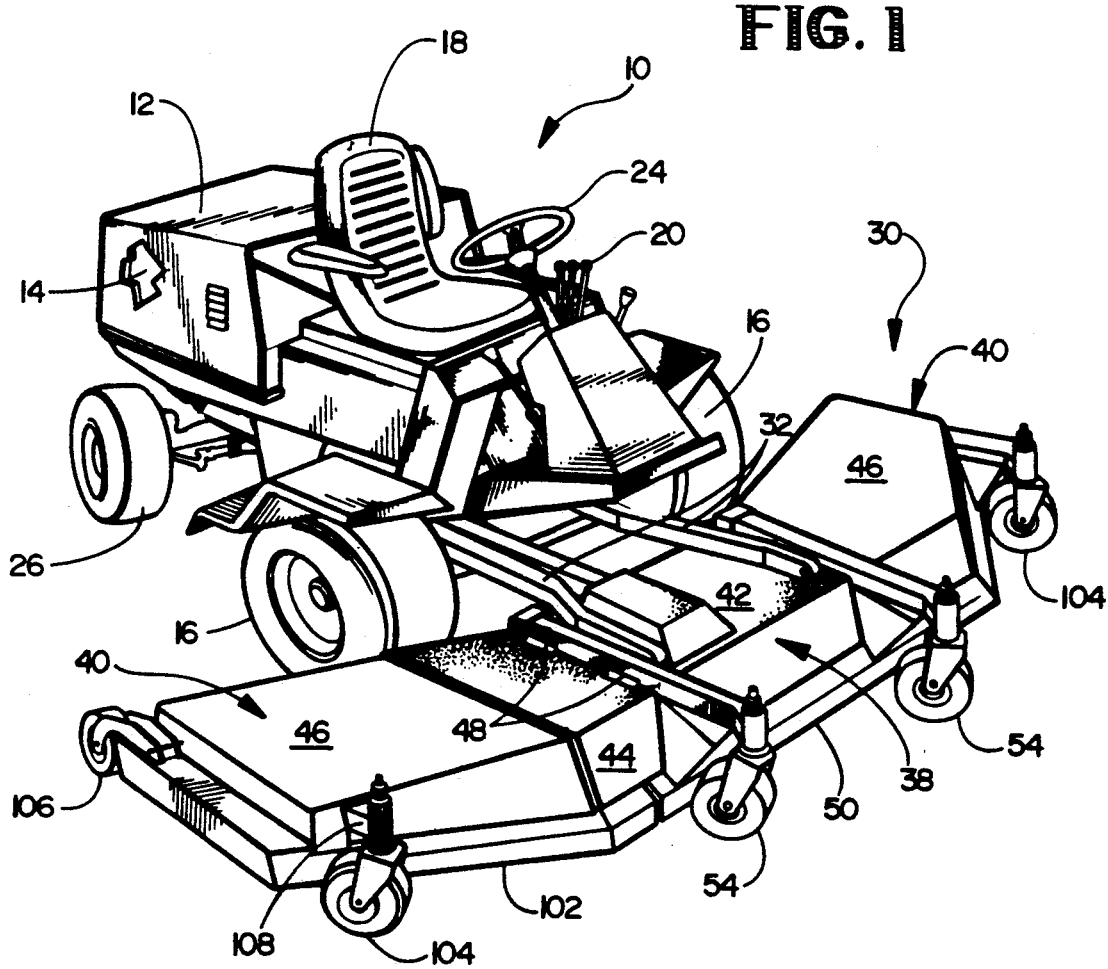
FIG. 1 is a perspective view of a riding mower incorporating the improved mower deck of the invention.
Figure 2:
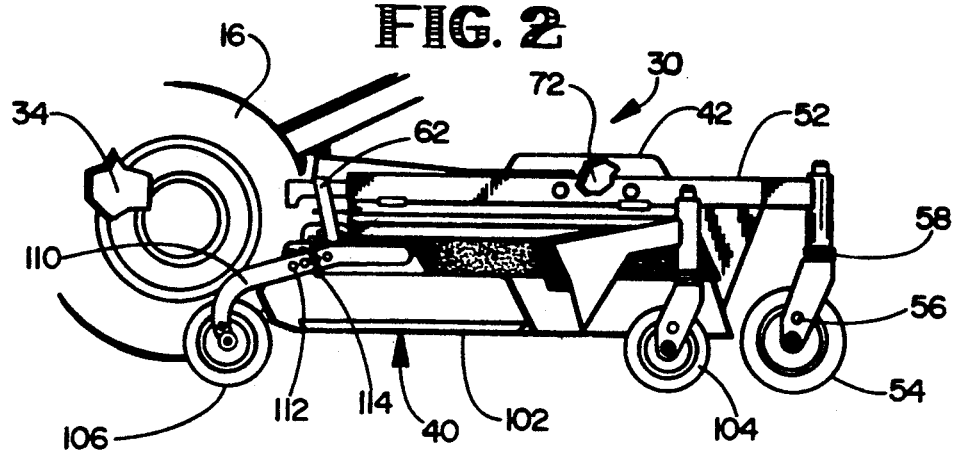
FIG. 2 is a side view of the mower deck herein.

Referring now to the Drawings, wherein like reference numerals designate or corresponding elements throughout the views, and particularly referring to FIG. 1, there is shown, a riding mower 10 of the type with which the invention herein is particularly useful. Such mowers are typically utilized for cutting relatively large areas such as parks and the like. The mower 10 includes a rear housing 12 enclosing an engine 14 which is coupled via a transmission (not shown) to a pair of front driving or traction wheels 16. The operator sits in a seat 18 positioned in front of the engine housing 12 and controls operation of the mower by means of hand controls 20, foot controls, and a steering wheel 24 which is coupled to a pair of rear wheels 26. The rear wheels 26 are of relatively smaller diameter and tread than the front traction wheels 16, for purposes of better maneuverability. A roll bar (not shown) may be provided over seat 18 for safety purposes. A cutting deck 30 incorporating the invention is carried on the front of mower 10. As will be explained more fully hereinafter, the mower deck 30 incorporates a unique belt drive arrangement which minimizes belt wear and misalignment while maintaining substantially constant belt tension to increase belt life and reduce related maintenance costs.

Although the invention herein is illustrated and described as being particularly useful with mower decks having rotary cutting blades, it could also be used with other types of cutting units, or used in other applications where a belt drive crosses a hinge axis.

The mower deck 30 is suspended from a pair of forward lift arms 32 which are actuated by cylinders 34 in order to raise or lower the entire deck as desired. When the deck 30 is in the lowered or down position, the cutting height is maintained by wheels on the deck and the tractor wheels 16. Ball joints 36 are preferably provided at the connections between the outer ends of the lift arms 32 and the deck 30 in order to allow for limited floating action.

The deck 30 includes a main deck section 38 and a pair of wing deck sections 40 connected to opposite sides thereof. A removable protective cover 42 is preferably provided on the top of the main deck section 38. Similarly, covers 44 and 46 are provided on the tops of the wing deck sections 40. Each inner cover 44 is preferably secured to an adjacent portion of the main deck section 38 by means of spring hinges 48 which normally bias the cover downwardly. The outer covers 46 are removably secured to the wing deck sections 38 with their inner ends extending beneath the outer ends of the inner covers 44 to allow for relative sliding movement when the wing deck sections are pivoted between their up and down positions.

The main deck section 38 comprises a frame 50 with a pair of laterally spaced apart arms 52 extending from the front end thereof. A caster wheel 54 is mounted on the end of each arm 52. Holes 56 and spacers 58 are provided in order to adjust the height of the caster wheels 54. The wheels 54 on the ends of arms 52 are preferably both offset relative to the trailing cutting blades t obtain a better cut quality. The cutting height at the front end of the mower deck 30 can thus be adjusted by means of the caster wheels 54. The cutting height at the rear of the mower deck 30 is adjustable by means of a pair of perforated brackets 60, hangers 62, and removable locking pins 64. The brackets 60 are secured to the rear of frame 50. The upper ends of hangers 62 extend over portions of the lift arms 32, however, the lower ends of the hangers can be adjustably secured to the perforated brackets 60 with pins 64.

Power input from the engine 14 of mower 10 is transmitted to the deck 30 via an electric clutch 66, U-joint 68, telescoping drive shaft 70, and a right angle drive gear box 72 which in turn is connected to the drive system 80 of the cutting deck 30.

The drive system 80 of the cutting deck 30 extends between the deck sections 38 and 40. In particular, the right angle drive gear box 72 is connected to a main drive pulley 82. A main drive belt 84 extends around the drive pulley 82, driven pulleys 86, 88 and 90. A fixed idler pulley 92 is provided along the belt path between pulleys 82 and 90. An adjustable idler pulley 94 is mounted along the belt path between driven pulleys 86 and 88. A tensioner assembly 96 is preferably connected to the idler pulley 94 for adjusting the tension of the main drive belt 84. Each of the driven pulleys 86, 88 and 90 is secured to a shaft extending through the main deck frame 50 to a cutting blade thereunder as shown in phantom lines. Three such cutting blades are carried on the main deck section 38.

The cutting blades on the wing deck sections 40 are independently driven by separate drive belts connected to the main deck section 38. In particular, belt 98 connects one wing deck section 40 to the drive pulley 86, while another belt 100 connects the other wing deck section to the drive pulley 90 on the main deck section. As will be explained more fully hereinafter, the orientation of the belts 98 and 100 relative to the hinge axis between the deck sections 38 and 40, and the manner in which these wing belts are selectively engaged and disengaged, comprise significant features of the present invention.

Each wing deck section 40 includes a frame 102 supported by front and rear wheels 104 and 106. The front caster wheel 104 is mounted on the end of an arm 108 and can be adjusted by means of holes and spacers similar to the caster wheels 54 on the main deck section 38. The trailing wheel 106 is carried at one end of a pivotal arm 110, the other end of which is pivoted to the wing deck frame 102 as shown. Pivotal positioning of the rear wheel 106 can be accomplished by means of holes 112 and a removable locking pin 114.

Each wing deck section 40 preferably includes a pair of cutting blades thereunder as shown in phantom lines, which blades are each drivingly connected to pulleys 116 and 118 driven by belt 98. A fixed idler pulley 120 is located along the belt path between the drive pulleys 116 and 118. Two other idler pulleys 122 and 124, are mounted along the belt path, between the drive pulley 118 and drive pulley 86. The idler pulley 122 is preferably adjustable by means of a tensioner assembly 126 in order to adjust the tension in belt 98 as desired. Two idler pulleys 128 and 130 are also mounted along the belt path between driven pulleys 86 and 116. A similar arrangement of driven and idler pulleys is utilized on the other wing deck section 40 with the drive belt 100.

It will be noted that the pulleys on the main deck section 38 and their counterparts on the wing deck section 40 are located relatively close to the hinge axis between the deck sections, but in relatively far spaced apart relationship along the hinge axis. Note in particular the relative orientation of idler pulleys 122 and 124, and that of idler pulleys 130 and 128. The belt 98 thus crosses the hinge axis at a shallow acute angle, in both directions, as opposed to near right angles in one or both directions as is typical of the prior art. When the wing deck section 40 pivots relative to the main deck section 30, twisting of belt 98 is thus primarily lengthwise. This reduces belt wear and potential misalignment, which in turn increases belt service life and reduces related maintenance costs. The same is true as to belt 100 for the other wing deck section 40. When the wing deck sections 40 pivot relative to the main deck section 38, tension on the belts 98 and 100 is maintained.

In contrast to the prior art, which typically incorporates mechanical clutch and brake arrangements, the cutting deck 30 incorporates electric clutch/brake units which are responsive to electrical switches that sense pivotal movement of the wing deck sections 40 beyond a normal range to immediately disengage the belts 98 and 100. In particular, an electric clutch/brake 131 is connected between the drive pulley 86 and wing belt 98. Similarly, another electric clutch/brake unit 132 is connected between the pulley 90 and wing belt 100. The electric clutch/brake 131 is responsive to a switch 134 associated with the hinge axis between the deck sections 38 and 40, and the other electric clutch/brake 132 is responsive to a similar switch on the other side. Such electric clutch/brake units are commercially available from various sources, and any suitable unit can be used. For example, the Model TR07 available from Ogura Clutch Co. Ltd. of Tokyo, Japan, can be utilized.

FIGS. 4 and 5 show the details of the hinge between the deck sections 38 and 40. Each wing deck section 40 is pivotally supported by means of a pair of upright links 136 and 138. The top ends of links 136 and 138 are pivoted to the main deck section 38, while their lower ends are pivoted to the associated wing deck section 40. Suitable stops 140 are provided for limiting relative pivotal movement of the wing deck sections 40, each of which is actuated by a cylinder 142. In accordance with the preferred embodiment, a ball joint 144 is provided at the lower ends of links 136 and 138 for floatation and adjustability.

If desired, a breakaway assembly 150 can be provided at the forward end of the hinge joints between the deck sections 38 and 40 of the mower deck 30 to provide some resilience in the event of impact by one of the wing deck sections with a tree, stump, rock or the like. In particularly, the breakaway assembly 150 includes a pair of plates 152 between which a pivotal yoke 154 is mounted. A pair of rollers 156 are provided at one end of the yoke 154 for receiving and normally retaining the associated front link 136 therein. A spring 157 is coupled between the other end of yoke 154 and a fixed bracket 158 in offset relationship in order to provide an over center action. A stop pin 160 between plates 152 serves to limit over rotation of the yoke 154. If the associated wing deck section 40 should impact something, the breakaway assembly 150 releases link 138 so that the deck section can raise and twist somewhat in a glancing fashion without bending. Raising and then lowering the wing deck section 40 will automatically reset the breakaway assembly 150.

Figure 3:
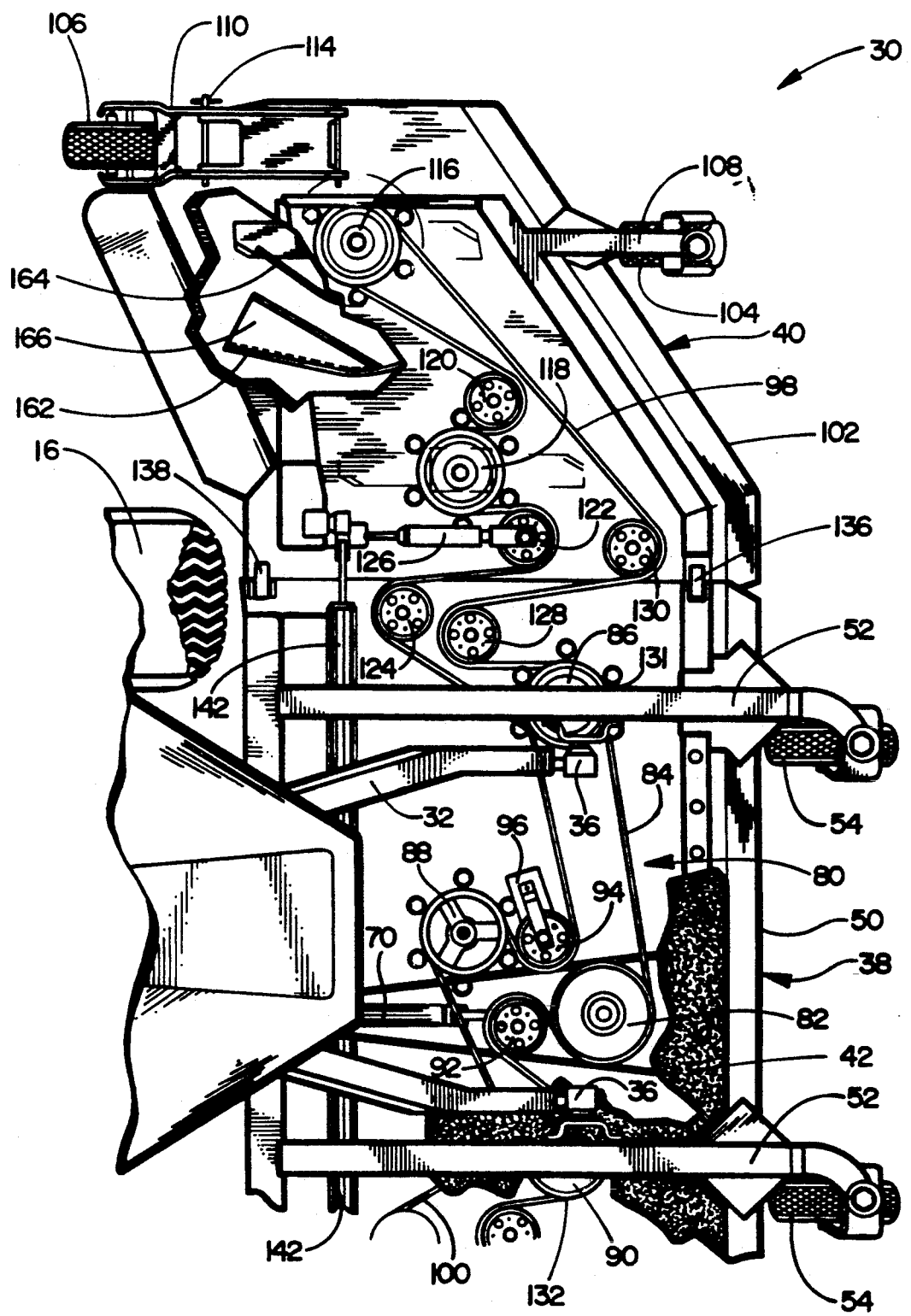
FIG. 3 is a partial top view (partially cutaway) of the mower deck herein.

Referring again to FIG. 3, the mower deck 30 preferably includes a shroud 162, baffle 164, and deflector plate 166 with each cutting blade. The shroud 162 preferably extends at least 180 degrees about the blade axis, depending upon the grass dispersion pattern desired. The baffle 164 preferably extends about 180 degrees about the discharge side of the blade axis. The triangular deflector plate 166 is secured at about a 45 degree angle between the inside trailing end of the shroud 162 and the flat underside of the deck section.

From the foregoing, it will thus be apparent that the present invention comprises an improved mower cutting deck having several advantages over the prior art. One significant advantage is the unique belt drive arrangement herein in combination with the use of electric clutch/brake units. Another advantage is the optional breakaway assemblies coupled between the pivotal wing sections and the main deck section. Other advantages will be evident to those skilled in the art.

Although particular embodiments of the invention have been illustrated in the Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A mower cutting unit, which comprises:
   a main cutting unit section:
   means for connecting said main cutting unit section to a traction unit for travel therewith;
   a wing cutting unit section;
   means for pivotally connecting said wing cutting unit section to said main cutting unit section for relative pivotal movement about a hinge axis;
   a plurality of blades, at least one blade being mounted on each of said main and wing cutting unit sections;
   means for selectively effecting drive of the blade on the main cutting unit section; and
   means including a belt interconnecting the blade on said main cutting unit section with the blade on said wing cutting unit section, said belt extending across the hinge axis at an acute angle in both directions so that twisting of the belt occurs in a primarily lengthwise direction upon relative pivotal movement of the cutting unit sections.

2. The mower cutting unit of claim 1, wherein said means for pivotally connecting said wing cutting unit section to said mower cutting unit section comprises:
   a pair of longitudinally spaced-apart links having upper and lower ends, the upper ends of said links being pivoted to the main cutting unit section and the lower ends of said links being pivoted to the wing cutting unit section; and
   stop means associated with said links for limiting relative pivotal movement of said cutting unit sections.

3. The mower cutting unit of claim 1, wherein said means for selectively effecting drive of the blades on the main cutting unit section comprises:
   a drive pulley;
   at least one driven pulley drivingly connected to each associated blade on said main cutting unit section;
   a belt interconnecting said pulleys; and
   an idler pulley engaging said belt between said drive and driven pulleys.

4. The mower cutting unit claim 1, further including:
   means for selectively effecting relative pivotal movement between said cutting unit sections.

5. The mower cutting unit of claim 1, further including:
   switch means associated with said pivotal connection means; and
   electric clutch/brake means responsive to said switch means and coupled between said drive means and said interconnection means for selectively disengaging drive to the blade on said wing cutting unit section upon predetermined relative pivotal positioning of said cutting unit sections.

6. The mower cutting unit of claim 1, further including:
   at least one vertically adjustable ground engaging wheel secured to each of said cutting unit sections.

7. The mower cutting unit of claim 1, further including:
   a semi-cylindrical baffle plate disposed between each blade and the respectively cutting unit section, said baffle plate being of relatively smaller diameter than the associated blade; and
   a semi-cylindrical shroud surrounding each blade and associated baffle plate in order to effect the desired dispersion of clippings.

8. A mower cutting unit, which comprises: a main cutting unit section having opposite sides and front and back ends, said main cutting unit section being adapted for connection to a traction unit for travel therewith;
   a pair of wing cutting unit sections positioned on opposite sides of said main cutting unit section;
   a pair of longitudinally spaced-apart pivot links coupled between each wing cutting unit section and the respective side of said main cutting unit section, each pivot link having a top end pivoted to said main cutting unit section and a bottom end pivoted to the respective wing cutting unit section, in order to interconnect said sections for relative pivotal movement about generally longitudinal hinge axes;
   stop means associated with said pivot links for limiting relative pivotal movement between said cutting unit sections;
   means for selectively effecting relative pivotal movement between said cutting unit sections;
   a plurality of blades, at least one blade being mounted for rotation on each of said main end wing cutting unit sections;
   means for selectively effecting drive of the blades on said main cutting unit sections; and
   means including a belt interconnecting the blades on said main cutting unit section with the blade on each of said wing cutting unit sections, each belt extending across the respective hinge axis at an acute angle in both directions so that twisting of the belt occurs in a primarily lengthwise direction upon relative pivotal movement of said cutting unit sections.

9. The mower cutting unit of claim 8, wherein said means for selectively effecting drive of the blades on the main cutting units section comprises:
   a drive pulley;
   at least one driven pulley drivingly connected to each associated blade on said main cutting unit section;
   a belt interconnecting said pulley; and
   an idler pulley engaging said belt between said drive and driven pulleys.

10. The mower cutting unit of claim 8, further including:
    switch means associated with said pivot links, and
    electric clutch/brake means responsive to said switch means and coupled between said drive means and said interconnection means for selectively disengaging drive to the blades on said wing cutting unit sections upon predetermined relative pivotal positioning of said cutting unit sections.

11. The mower cutting unit of claim 8, further including:
    at least one vertically adjustable ground engaging wheel secured to each of said cutting unit sections.

12. The mower cutting unit of claim 8, further including:
    a semi-cylindrical baffle plate disposed between each blade and the respective cutting unit section, said baffle plate being of relatively smaller diameter than the associated blade; and
    a semi-cylindrical shroud surrounding each blade and associated baffle plate in order to effect the desired dispersion of clippings.

13. The mower cutting unit of claim 8, further including:
    means defining a resilient breakaway connection between said main cutting unit section and the bottom end of each leading pivot link for permitting limited outward movement of the associated wing cutting unit section upon contact with an immovable object.

14. A sectional cutting unit for a mower, comprising:
    a main cutting unit section having opposite sides and front and rear ends;
    means for connecting said main cutting unit section to a traction unit for travel therewith;
    a pair of wing cutting unit sections, one pivoted to each side of said main cutting unit section for independent relative pivotal movement therewith about generally longitudinal hinge axes;
    switch means for sensing predetermined relative pivotal positioning between each wing cutting unit section and said main cutting unit section;
    at least one vertically adjustable ground-engaging wheel mounted on each side of said cutting unit sections;
    a drive pulley mounted on said main cutting unit section;
    a plurality of driven pulleys, at least one driven pulley being mounted on each of said main and wing cutting unit sections;
    a cutting blade drivingly connected to each of said driven pulleys;
    a main drive belt interconnecting the drive and driven pulleys on said main cutting unit section;
    a pair of wing drive belts, each wing drive belt interconnecting one of the driven pulleys on said main cutting unit section and the driven pulley on the associated wing cutting unit section;
    means including a plurality of idlers defining path for said wings belts which extend across the hinge axes at acute angles in both directions so that twisting of the belts occurs in a primarily lengthwise direction upon relative pivotal movement of said cutting unit sections;
    electric clutch/brake means connected between each respective driven pulley on said main cutting unit section and the wing drive belt for selectively disengaging drive of the blades thereon, said electric clutch/brake units being responsive to said switch means in order to selectively disengage drive to the blades on said wing back cutting unit sections.

15. The mower cutting unit of claim 14, further including:
    a semi-cylindrical baffle plate disposed between each blade and the respective cutting unit section, said baffle plate being of relatively smaller diameter than the associated blade; and
    a semi-cylindrical shroud surrounding each blade and associated baffle plate, said baffle plate and shroud each having openings oriented rearwardly in order to effect the desired dispersion of clippings.

* * * * *